United States Patent
Ariyoshi et al.

(10) Patent No.: US 7,123,565 B2
(45) Date of Patent: Oct. 17, 2006

(54) INFORMATION REPRODUCING METHOD AND INFORMATION REPRODUCING APPARATUS OF MULTILAYER OPTICAL DISK

(75) Inventors: Tetsuo Ariyoshi, Kokubinji (JP); Takeshi Shimano, Tokorozawa (JP); Harukazu Miyamoto, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 470 days.

(21) Appl. No.: 10/368,415

(22) Filed: Feb. 20, 2003

(65) Prior Publication Data
US 2004/0095860 A1 May 20, 2004

(30) Foreign Application Priority Data
Nov. 19, 2002 (JP) .............................. 2002-334477

(51) Int. Cl.
*G11B 7/00* (2006.01)
(52) U.S. Cl. .............................. 369/53.22; 369/44.23; 369/94; 369/112.01
(58) Field of Classification Search ............ 369/44.32, 369/44.23, 47.53, 53.2, 53.19, 53.28, 53.45, 369/112.23, 112.02, 112.26, 275.1, 275.4
See application file for complete search history.

(56) References Cited

U.S. PATENT DOCUMENTS

| | | | | |
|---|---|---|---|---|
| 5,926,450 A | * | 7/1999 | Braat | 369/53.2 |
| 6,430,137 B1 | * | 8/2002 | Saimi et al. | 369/112.1 |
| 6,473,386 B1 | * | 10/2002 | Ophey | 369/112.23 |
| 6,532,202 B1 | * | 3/2003 | Wada et al. | 369/112.02 |
| 6,567,365 B1 | * | 5/2003 | Hendriks et al. | 369/112.02 |
| 6,584,065 B1 | * | 6/2003 | Maeda et al. | 369/275.1 |
| 6,586,717 B1 | * | 7/2003 | Vrehen et al. | 369/53.19 |
| 6,738,332 B1 | * | 5/2004 | Sato et al. | 369/53.28 |
| 6,771,584 B1 | * | 8/2004 | Yamanaka | 369/112.23 |
| 6,934,226 B1 | * | 8/2005 | Yasuda et al. | 369/44.23 |
| 2001/0055256 A1 | * | 12/2001 | Ueki | 369/53.23 |
| 2002/0060958 A1 | * | 5/2002 | Ando et al. | 369/44.23 |

OTHER PUBLICATIONS

Jpn.J.Appl.Phys.vol. 39 (2000) 937-942.
Jpn.J.Appl.Phys.vol. 40 (2001) 2292-2295.
Jpn.J.Appl.Phys.vol. 41 (2002) 1842-1843.
Technical Report of IEICE, MR2001-93 vol. 101 No. 564 (2002) 31-36.
Proceedings of International Symposium for three-dimensional memories (2002) 33-35.
JP-A-2002-100061.

* cited by examiner

*Primary Examiner*—Thang V. Tran
*Assistant Examiner*—Tawfik Goma
(74) *Attorney, Agent, or Firm*—Antonelli, Terry, Stout and Kraus, LLP.

(57) ABSTRACT

When reproducing a multilayer optical disk using a high-numerical-aperture objective, the period of time required before the disk is reproduced is reduced by discriminating recording layers. A spherical aberration signal is detected as a differential signal between focus position fluctuation signals respectively in a central section and in a peripheral section of a reproduced flux of light. A recording layer is discriminated using a quantity of correction of spherical aberration at a zero-crossing point of a level or a spherical aberration signal associated with the differential signal. After adding the spherical aberration for the correction of the discriminated layer, residual spherical aberration is corrected by feedback control using a residual spherical aberration signal.

3 Claims, 14 Drawing Sheets

DIFFRACTION GRATING

POSITIONS OF SPOTS ON DISK

SINGLE-LAYERED DISK

DUAL-LAYERED DISK

QUADRUPLE-LAYERED DISK

FIG. 13

| QUANTITY OF DRIVE DISTANCE OF SPHERICAL ABERRATION CORRECTING ELEMENT (EQUIVALENT QUANTITY REFERRED TO CORRECTED SUBSTRATE THICKNESS FLUCTUATION) | SPHERICAL ABERRATION SIGNAL VOLTAGE |
|---|---|
| 50 | -0.09 |
| 45 | -0.1 |
| 40 | -0.12 |
| 35 | -0.15 |
| 30 | -0.2 |
| 25 | -0.25 |
| 20 | -0.3 |
| 15 | -0.33 |
| 10 | -0.36 |
| 5 | -0.34 |
| 0 | -0.3 |
| -5 | -0.22 |
| -10 | -0.1 |
| -15 | 0 |
| -20 | 0.1 |
| -25 | 0.22 |
| -30 | 0.3 |
| -35 | 0.34 |
| -40 | 0.36 |
| -45 | 0.33 |
| -50 | 0.3 |

INFORMATION REPRODUCING METHOD AND INFORMATION REPRODUCING APPARATUS OF MULTILAYER OPTICAL DISK

BACKGROUND OF THE INVENTION

The present invention relates to an information reproducing method using light emitted from a laser, and in particular, to a layer discriminating method indispensable to reproduce information on a multilayer optical disk using a blue-violet laser diode and a high-numerical-aperture objective and a method of detecting and correcting spherical aberration in the reproducing of information.

Picture or image recording apparatuses broadly used today generally utilize videotapes. Recently, a picture recording apparatus using an optical disk has been put to the market. The optical disk is quite suitable to access information thereon in a random fashion and has high usability. Quality of pictures on the optical disk hardly changes even after repetitious reproduction thereof and with the lapse of time. Moreover, the optical disk has only quite small volume. Therefore, it can be considered that the picture recording apparatuses will commonly use optical disks in the future. The optical disk is employed for various purposes in addition to the recording of information, for example, as an external storage of a computer and a music recording and reproducing device. Therefore, the optical disk expectedly becomes more important in the future.

In the telecasting, the satellite broadcast and the ground-wave broadcast will be digitized within a target period ranging from 2003 to 2005. In association therewith, it is considered that broadcast of mobile pictures finer in picture quality than the broadcast of today will be widely spread for family use and demands for digital recording of such highly-fine mobile pictures become stronger. To record the mobile pictures for about two hours with the picture quality kept unchanged, it is necessary to store a large amount of data of about 20 gigabytes (GB) 25 GB on a disk with a diameter of 12 centimeters (cm), the diameter being substantially equal to that of a compact disk or a DVD. That is, the recording capacity needs to be about five times that of the DVD today.

To increase the recording density, it is required that the laser light source has a shorter wavelength and the numerical aperture of an objective is increased to thereby reduce the diameter of spots for the information recording and reproducing operations. The recording capacity can be increased by using a multilayer recording technique for advantages of optical disks. At present, the laser light source of a DVD has a wavelength of about 660 nanometers (nm) and a numerical aperture of about 0.6, and the recording capacity is 4.7 GB on a single surface of one disk layer. As a laser light source having a shorter wavelength, a blue-violet laser diode (with a wavelength of 400 nm) is being put to practical uses. With this laser light source, a recording capacity of 50 GB is obtained on a single-sided, dual-layered disk when the numerical aperture is 0.85.

Such a single-sided optical disk having a recording capacity of 25 GB for each layer is described in, for example, pages 937 to 942 of Jpn. J. Appl. Phys. Vol. 39 (2000). Two groups of objectives are used to obtain a maximum numerical aperture of 0.85. When the numerical aperture is increased, there arises a problem of increase in aberration due to fluctuation in an optical system and errors in thickness and inclination of a disk substrate. To overcome the problem in the prior art example described above, the thickness of the substrate is reduced down to 0.1 millimeter (mm) to minimize coma aberration caused by the disk inclination. To compensate for spherical aberration caused by the error in the thickness of the substrate, the position of a collimator lens is changed.

Methods to detect, as an electric signal, spherical aberration caused by the error in the substrate thickness are described in pages 2292 to 2295 of Jpn. J. Appl. Phys. Vol. 40 (2001) and pages 1842 and 1843 of Jpn. J. Appl. Phys. Vol. 41 (2002). In the methods of the prior art, focus position fluctuation signals in a near-axis area and a far-axis area of a flux of reflected light from an optical disk are respectively detected to obtain a differential signal therebetween as a spherical aberration signal. By feeding the signal back to a liquid-crystal (LC) spherical aberration correcting element, the spherical aberration is successfully detected and corrected.

A rewritable dual-layered disk with a recording capacity of about 50 GB is described in pages 31 to 36 of Technical Report of IEICE, MR2001-93 Vol. 101 No. 564 (2002) and a write-once quadruple-layered disk with a recording capacity of about 100 GB is described in pages 33 to 35 of Proceedings of international symposium for three-dimensional memories (2002). As above, the recording capacity can be increased by using a multilayer recording disk for advantage of the optical disk. In these multilayer recording disks, to reduce crosstalk due to record signals of another layer down to a level to prevent adverse influence thereof, the gap between the recording layers ranges from about 20 micrometers ($\mu$m) to about 30 $\mu$m. Spherical aberration due to the gap is 0.2 r$\lambda$rms or more and remarkably exceeds the Marechal's condition (wavefront aberration is at most 0.07 r$\lambda$rms). Therefore, it is required to correct the spherical aberration in the recording and reproducing operations of a multilayer recording disk.

JP-A-2002-100061 describes a method of reproducing a multilayer recording disk. When a multilayer disk is reproduced according to the prior art example, spherical aberration is beforehand corrected for a predetermined quantity thereof, a recording layer is moved or an autofocus operation is conducted to obtain a reproduced signal for which spherical aberration is corrected.

[Non-patent article 1] Jpn. J. Appl. Phys. Vol. 39(2000) 937–942

[Non-patent article 2] Jpn. J. Appl. Phys. Vol. 40(2001) 2292–2295

[Non-patent article 3] Jpn. J. Appl. Phys. Vol. 41(2002) 1842–1843

[Non-patent article 4] Technical report of IEICE, MR2001-93 Vol. 101 No.564(2002)31–36

[Patent article 1] JP-A-2002-100061

SUMMARY OF THE INVENTION

In the prior art example, it is required to beforehand discriminate a recording layer in focus to move the recording layer after correcting spherical aberration for a predetermined quantity. Even if the autofocus is conducted after correcting spherical aberration for a predetermined quantity, it is not guaranteed that the target layer comes into focus. Therefore, it is required to beforehand discriminate a recording layer in focus. To ordinarily discriminate a layer in focus, it is necessary to read information concerning a recording layer, the information being recorded in an emboss pit or wobble in a lead-in area of the disk. To read the information from a single-layered disk, light is first focused on the layer and the head is moved onto the lead-in area to read the information using tracking servo. However, in the operation to read the information from a multilayer disk, the tracking servo cannot be achieved without correcting spherical aberration. Consequently, the information cannot be read therefrom in this situation. To read the information in the prior art example, until a condition under which the information can be read therefrom is satisfied, a trial-and-error procedure must be repeatedly conducted. In each operation of the procedure, the spherical aberration is corrected for a predetermined quantity, the tracking is carried out, and then the lead-in area is reproduced. The procedure must be conducted two times for a dual-layered disk and four times for a quadruple-layered disk. This elongates a period of time from when the disk is loaded to when the reproducing operation can be conducted. It is necessary to beforehand record layer information on each disk layer of the multilayer disk and hence mutually different disk stampers must be used for the respective layers. This leads to a problem of increase in the disk production cost.

It is therefore an object of the present invention, which has been proposed in consideration of the problems of the prior art technique, to provide a method of reproducing information in which in an optical disk medium with a plurality of information recording layers, a layer in focus is discriminated to correct spherical aberration of the layer.

In accordance with the present invention, to achieve the object, there are provided a spherical aberration detecting unit to detect spherical aberration occurring when a signal reproducing operation is conducted for a plurality of layers, a spherical aberration correcting unit to correct the spherical aberration, and a unit to discriminate, according to a spherical aberration signal from the spherical aberration correcting unit, one of the layers in focus.

According to the present invention, the layer can be discriminated without reproducing record layer information in the lead-in area. Therefore, the period of time from when the disk is loaded to when the reproducing operation can be conducted is reduced and hence usability is improved. It is not required to beforehand record layer information in each layer of the multilayer disk. Therefore, the user can use an inexpensive multilayer disk with equally formatted layers.

According to the present invention, light is focused on a predetermined layer selected from the optical disk medium having a plurality of information recording layers. The layer in focus is discriminated using a signal level or a signal polarity of the spherical aberration signal from the spherical aberration detecting unit. A quantity of spherical aberration to correct the spherical aberration of the discriminated layer is added by the spherical aberration correcting unit to resultantly reproduce information on the predetermined layer.

By using the method, it is not required to detect in a trial-and-error procedure an optimal value of the spherical aberration quantity for the correction of spherical aberration before the layer information in the lead-in area is reproduced. This consequently reduces the period of time from when the disk is loaded to when the reproducing operation is conducted. Since it is not required to beforehand record layer information in each layer, the user can use an inexpensive multilayer disk with equally formatted layers.

According to the present invention, light is focused on a predetermined layer selected from the optical disk medium having a plurality of information recording layers. A spherical aberration quantity to be added by the spherical aberration correcting unit is detected through a scanning operation or by stepwise adding a predetermined quantity of spherical aberration. The operation is conducted such that the spherical aberration signal from the spherical aberration detecting unit behaves in substantially the same way as a spherical aberration signal corresponding to a state in which the spherical aberration is almost zero. The layer in focus is discriminated using the detected spherical aberration quantity, and a quantity of spherical aberration to correct the spherical aberration of the discriminated layer is added by the spherical aberration correcting unit to reproduce information of the predetermined layer.

In addition, the quantity of spherical aberration for the correction of the discriminated layer is added by the spherical aberration correcting unit and then a spherical aberration signal is fed back to a spherical aberration correcting element to correct residual spherical aberration to resultantly reproduce information of the predetermined layer.

Other objects, features and advantages of the invention will become apparent from the following description of the embodiments of the invention taken in conjunction with the accompanying drawings.

BRIEF DESCRIPTION OF THE DRAWINGS

FIG. 13 is a table in a memory to store a relationship between a quantity of drive of the spherical aberration correcting element and a voltage value of a spherical aberration signal.

DESCRIPTION OF THE EMBODIMENTS

Figure 1:
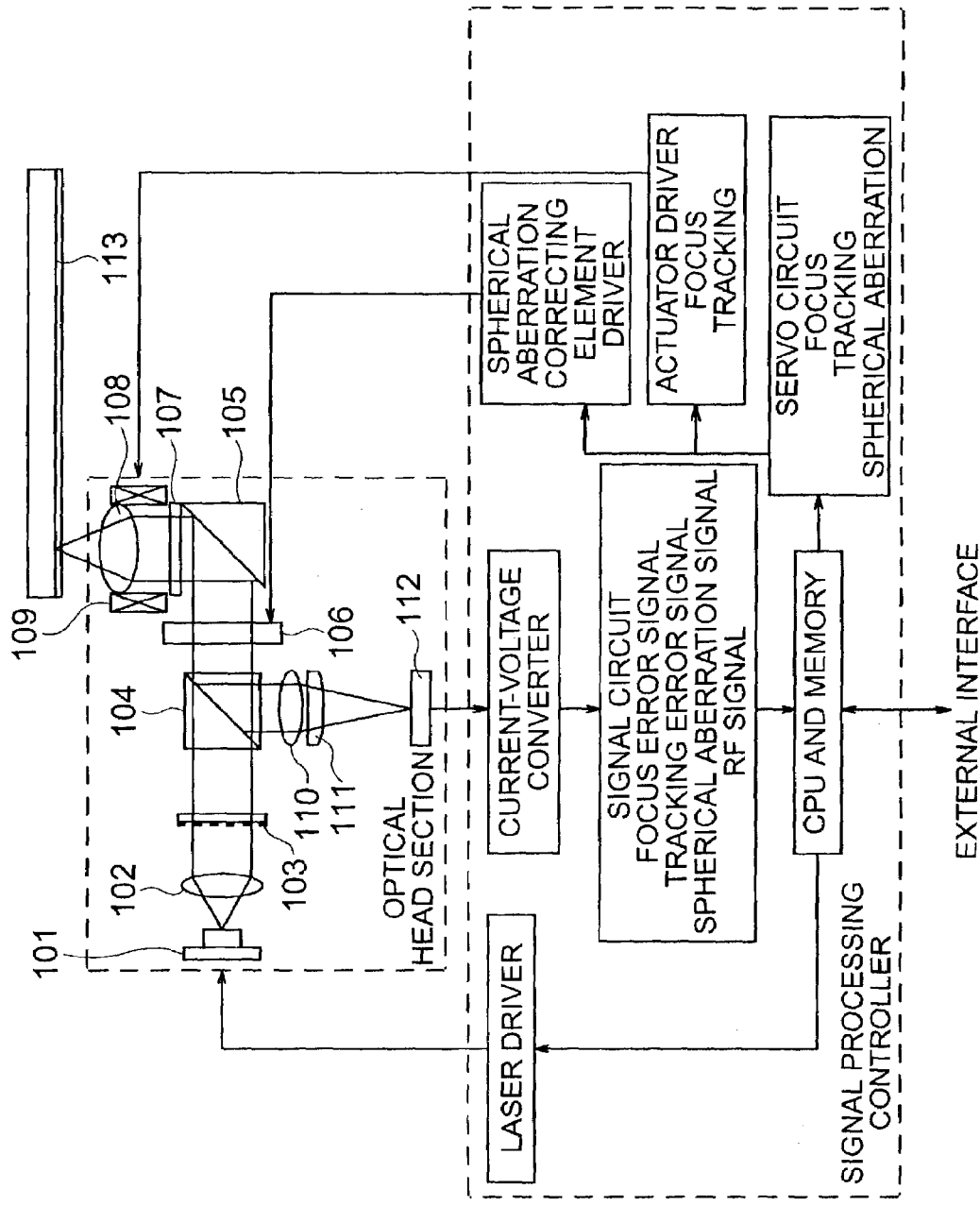
FIG. 1 is a diagram showing an optical head section and a signal processing controller of an embodiment of an information reproducing apparatus according to the present invention.

Referring now to the drawings, description will be given in detail of an embodiment of the present invention. FIG. 1 shows an information reproducing apparatus to achieve an information reproducing method for a multilayer disk according to the present invention. The information reproducing apparatus mainly includes an optical head section and a signal processing controller. The optical head section includes a blue laser diode 101 emitting a beam of light having a wavelength of 405 nm, a collimator lens 102 with a focal length of 13 mm to collimate a laser beam into a collimated beam, a diffraction grating 103, a polarized beam splitter 104, a mirror 105, a spherical aberration correcting element 106, a quarter-wave plate 107, an objective 108, an objective actuator 109, a condenser lens 110 with a focal length of 13 mm, a cylindrical lens 111 with a focal length of 200 mm, and a detector 112. The objective 108 has an effective diameter of 3 mm, a numerical aperture of 0.85, and a focal length of 1.77 mm. The objective 108 is optimized for a polycarbonate substrate with a substrate thickness of 0.1 mm. Although the embodiment includes one objective, it is also possible to use a combination lens including two or more lenses. The cylindrical lens 111 is arranged with an angle of 45° relative to a radial direction of the disk to detect a focus error in an astigmatic method and a tracking error in a pushpull method. The signal processing controller includes a current-voltage converter to convert an optical current from the detector 112 into a voltage, a signal circuit to produce a focus error signal, a tracking error signal, a spherical aberration signal, and a reproduced radio-frequency (RF) signal; a servo circuit to correct a focus error, a tracking error, and spherical aberration; an actuator driver circuit, a spherical aberration element driver circuit, a central processing unit (CPU), a memory, and a laser driver circuit. The information reproducing apparatus is employed to read information stored on an optical disk medium 113.

Figure 2A:
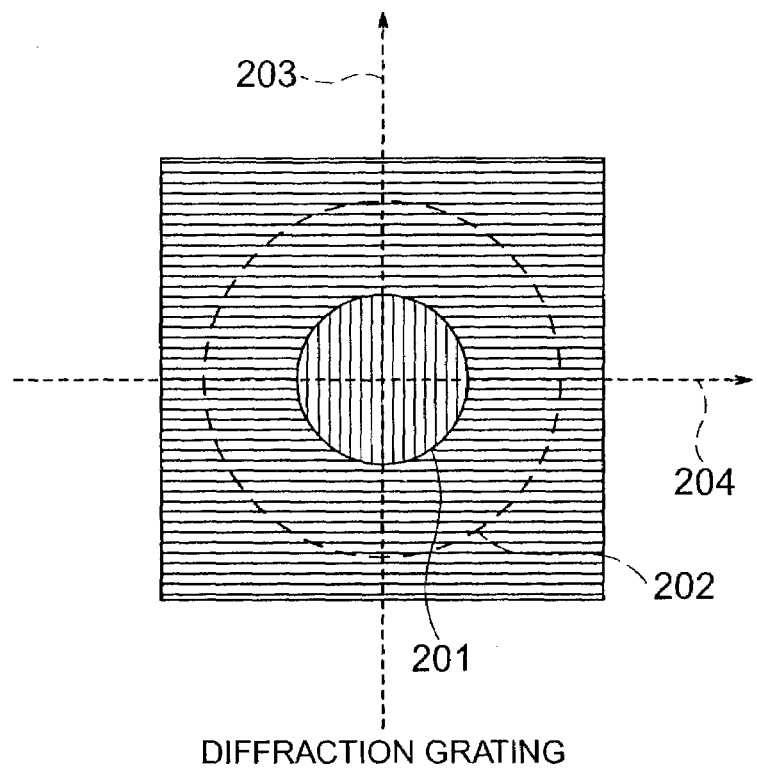
FIGS. 2A and 2B are diagrams respectively showing a diffraction grating used in an optical head and a spot layout on an optical disk according to the present invention.
Figure 2B:
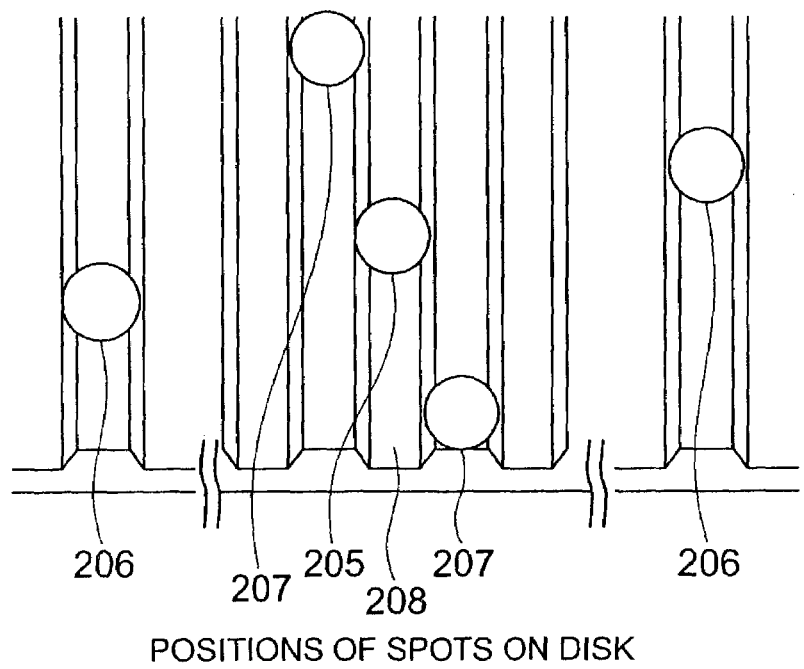

FIG. 2A shows the diffraction grating 103 of the embodiment. FIG. 2B schematically shows a layout of spots formed on a disk by the diffraction grating 103. To prevent a subspot from erasing a record mark in a recording operation of a signal, the grating 103 is designed such that six percent (6%) of intensity of light incident thereto is obtained as diffracted light of plus first order and minus first order. Additionally, the grating 103 is designed such that a central section 201 with a flux diameter of 105 of an incident light flux with a flux diameter of 3 mm and a remaining peripheral section 202 of the incident light flux are diffracted in mutually different directions. In the embodiment, the grating is formed in its central section with a period of 50 μm to diffract light in a disk radial direction 204 with a diffraction angle of 0.5°. The grating is formed in its peripheral section with a period of 50 μm to diffract light in a disk tangential direction 203 with a diffraction angle of 0.5°. Diffracted light of 0th order diffraction, i.e., light not diffracted is focused as a main spot 205 onto a groove area in which data is to be recorded. The attaching angle of the grating 103 is adjusted such that subspots 207 produced through diffraction by the peripheral section 202 are placed in a land area in which data is not recorded. Subspots 206 produced through diffraction by the central section 201 are not influenced by land-groove structure of the optical disk medium. Therefore, the subspots 206 can be substantially placed in the land or groove.

Figure 3:
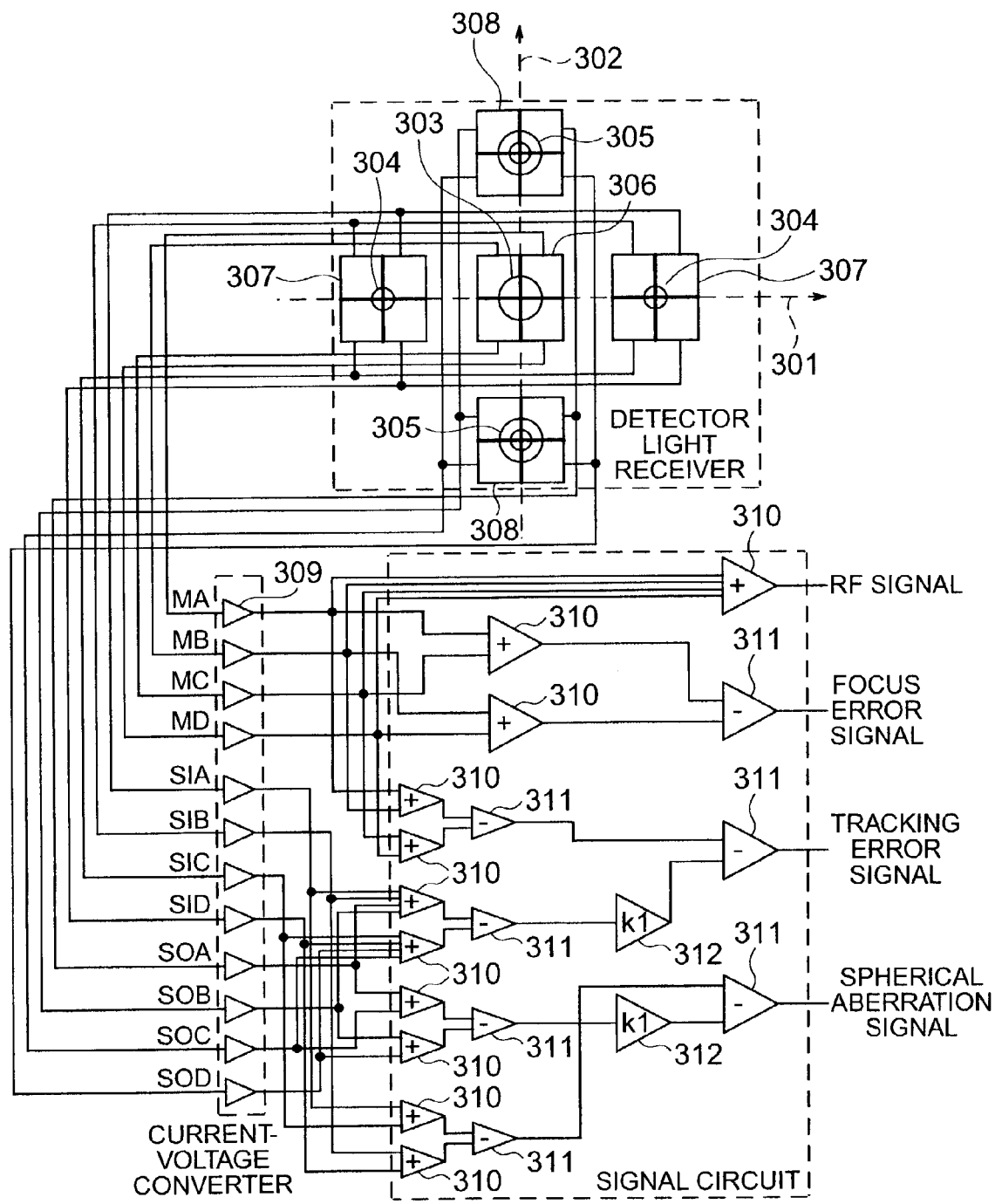
FIG. 3 is a diagram showing a pattern of a light receiving section and a signal circuit of an optical head according to the present invention.

FIG. 3 shows a light receiver section of a detector, a current-voltage converter circuit to convert an optical current from the light receiver section into a voltage, and a signal circuit for processing signals from the light receiver section to produce a reproduced RF signal, a focus error signal, a tracking error signal, and a spherical aberration signal in the embodiment. In the configuration, numerals 301 and 302 indicate a disk radial direction and a disk tangential direction, respectively. The detector is placed at a position adjusted such that a main spot 303 of reflected light from a disk, a subspot 304 of a central flux, and a subspot 305 of a peripheral flux are focused respectively onto a main spot receiving section 306, a central flux subspot receiving section 307, and a peripheral flux subspot receiving section 308. In the detector, each spot has a diameter of about 40 μm, and a square with an side length of about 85 μm is equally divided into four light receiving sections to detect respective spots. Substantially equal light receiving sections of the subspots are connected to each other. A current obtained through photoelectric conversion by the respective light receiving sections is converted by an associated current-voltage converter 309 into a voltage to be processed through an adder 310, a differential operational unit 311, and a variable gain amplifier 312 as follows.

Reproduced RF signal=$MA+MB+MC+MD$

Focus error signal=$(MA+MC)-(MB+MD)$

Tracking error signal=$\{(MA+MB)-(MC+MD)\}-k1\{(SIA+SIB+SOA+SOB)-(SIC+SID+SOC+SOD)\}$ Spherical aberration signal=$\{(SIA+SIC)-(SIB+SID)\}-k2\{(SOA+SOC)-(SOB+SOD)\}$ The focus error signal is detected using the astigmatic method, and the tracking error is detected by the differential pushpull method. The spherical aberration signal is detected using the difference between the focus error signal of the central flux section and that of the peripheral flux section. The value of k1 is adjusted such that the pushpull signal of the main spot and that of the subspot substantially equal in amplitude to each other. The value of k2 is adjusted to be within a range not to cause any offset of the spherical aberration signal by a defocusing operation.

Figure 4:
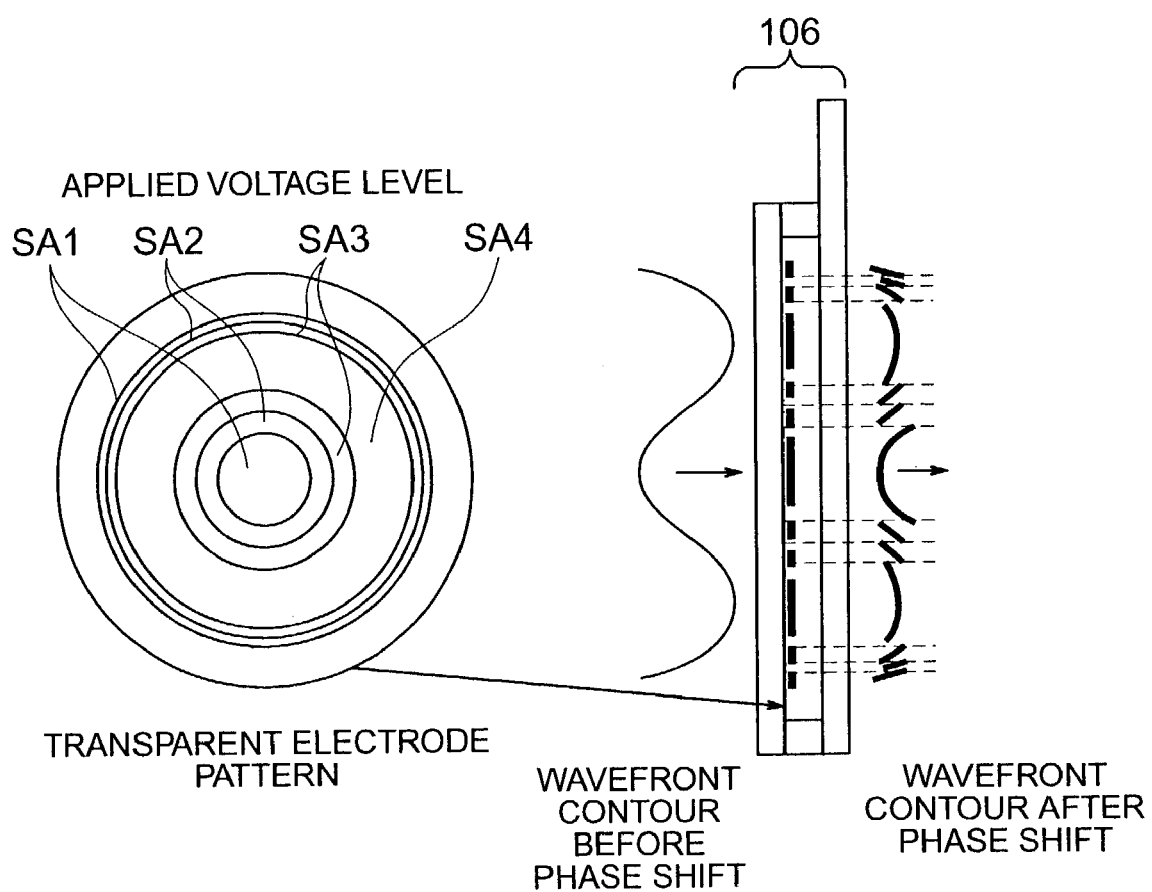
FIG. 4 is a diagram showing a spherical aberration correcting element (liquid-crystal element) used in an optical head according to the present invention.
Figure 5:
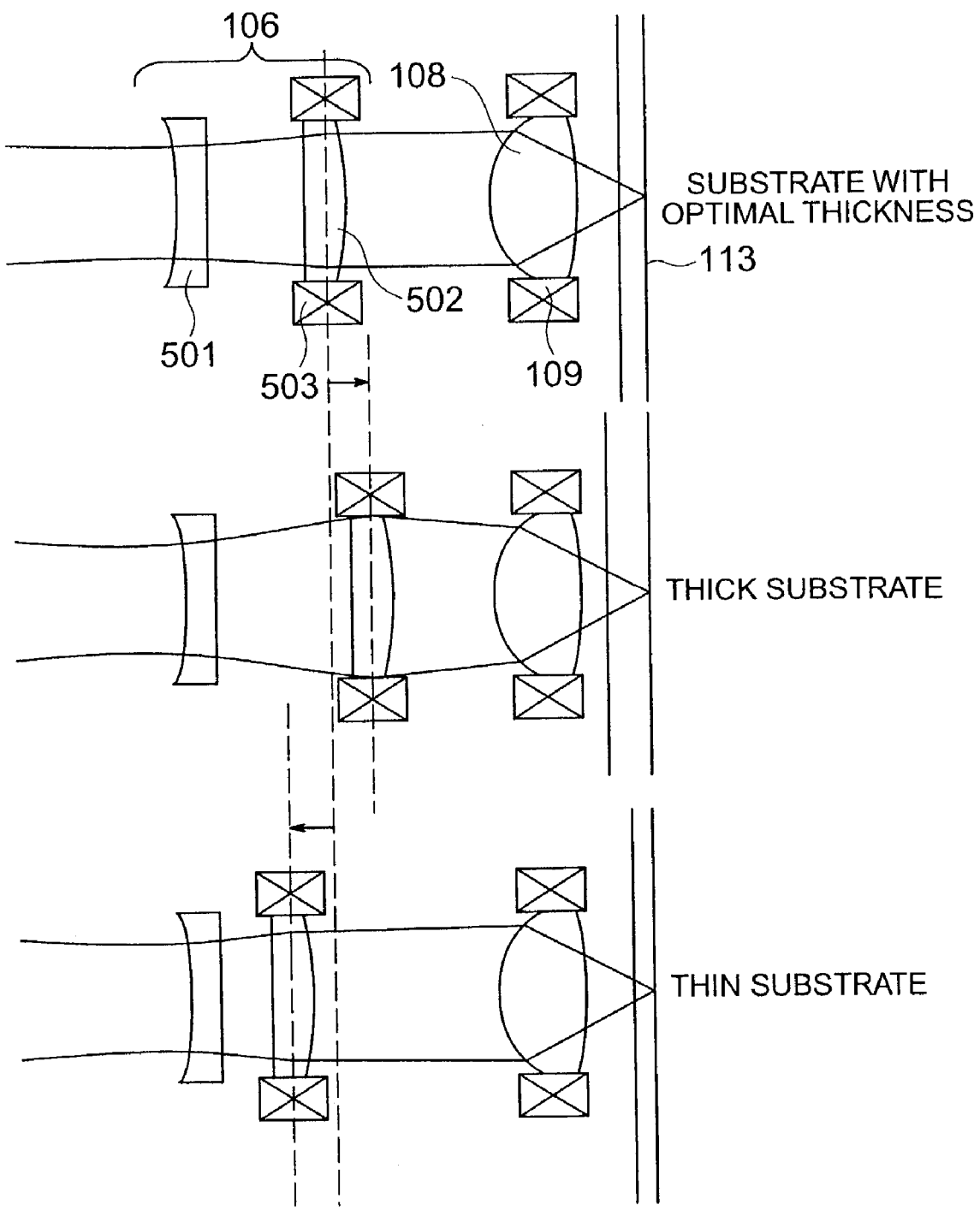
FIG. 5 is a diagram showing a spherical aberration correcting element (expander lens) used in an optical head according to the present invention.

Next, the spherical aberration correcting element will be described. FIGS. 4 and 5 show spherical aberration correcting elements using a liquid-crystal (LC) shifter and an expander lens, respectively.

Figure 6:
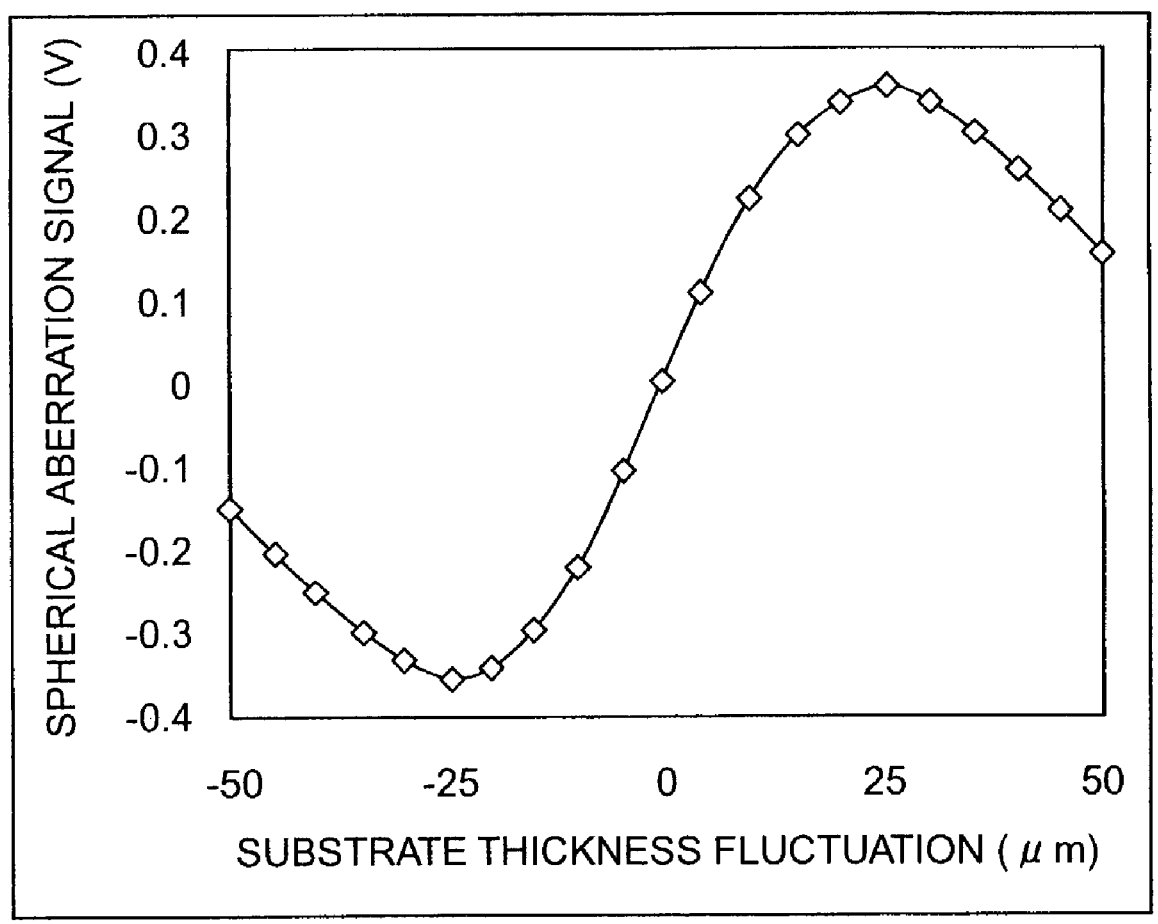
FIG. 6 is a graph showing a spherical aberration signal (calculated value) from an information reproducing apparatus according to the present invention.

In FIG. 4, the LC spherical aberration correcting element includes seven concentric areas of transparent electrodes. By applying voltages at four levels to the electrodes, phases of light passing through the respective areas are shifted. That is, a wavefront contour having spherical aberration before the phase shift is converted into a wavefront contour after the phase shift to reduce the spherical aberration. The expander lens includes two lenses, i.e., one concave lens 501 and one convex lens 502 as shown in FIG. 5. One of the lenses 501 and 502 is mounted on a one-axial actuator 503. Ordinarily, the expander lens is adjusted such that incident collimated light is emitted also as collimated light. In the configuration, a gap between the lenses can be changed by the actuator 503 so that the expander lens emits convergent or divergent light. When convergent or divergent light is incident to the objective, spherical aberration occurs according to the degree of conversion or diversion of the incident light. The spherical aberration is canceled with that caused by a substrate thickness error and is resultantly corrected. FIG. 6 shows a graph demonstrating voltage values of the spherical aberration signal obtained in a fluctuation range of −50 μm to 50 μm of substrate thickness. Since the voltage changes depending on the conversion efficiency of the current-voltage converter and the gain of an amplifier in a subsequent stage, the voltage values do not indicate any essential meaning. The substrate thickness fluctuation is the difference between thickness of a cover layer through which the reproduced light passes to reach a target recording layer and an optimal substrate thickness of 100 μm of the objective 108. For example, when the cover layer has a thickness of 70 μm, the substrate thickness fluctuation is defined as −30 μm. When the cover layer has a thickness of 130 μm, the substrate thickness fluctuation is defined as 30 μm. The spherical aberration signal linearly changes in a range from −10 μm to +10 μm. Beyond the range, the signal changes in a nonlinear fashion. Beyond a range from −25 μm to +25 μm, the signal value reduces as the substrate thickness fluctuation increases. Therefore, in this range, the spherical aberration servo cannot be achieved by simply using the spherical aberration signal. To enlarge the range, the range to acquire the focus error signal is broadened by decreasing the focal length of the cylindrical lens 111. However, sensitivity of the focus error signal also decreases in this case. This also lowers precision of the autofocus operation, and hence a satisfactory and appropriate reproduction characteristic cannot be obtained.

Figure 7A:
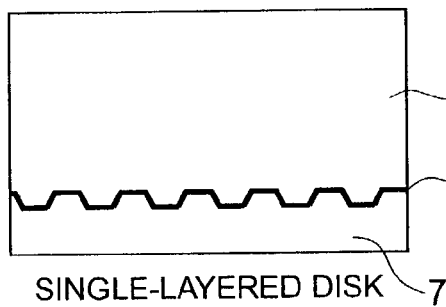
FIGS. 7A and 7B are diagrams respectively showing configurations of single-layered and dual-layered disks.
Figure 7B:
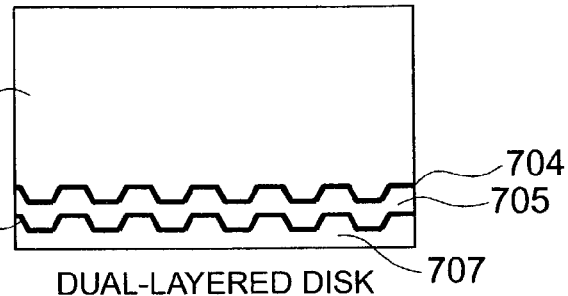

FIGS. 7A and 7B schematically show configurations of a single-layered disk and a dual-layered disk, respectively. The information reproducing apparatus reproduces information recorded on these disks. The single-layered disk is fabricated as follows. On a 1.1 mm thick polycarbonate layer 701 with tracking grooves formed thereon, a recording film 702 is coated and then a 0.1 mm thick polycarbonate cover layer 703 is attached onto the recording film 702. The recording and reproducing operations are conducted through the 0.1 mm thick cover layer 703. The polycarbonate cover layer 703 has thickness fluctuation associated with its production, and hence the specified thickness thereof is 100 μm±5 μm. The dual-layered disk is fabricated as follows. On a 1.1 mm thick polycarbonate layer 701 with tracking grooves formed thereon, a recording film as an L1 recording layer 704 is coated and then a 25 μm thick transparent intermediate layer 705 is formed on the layer 704 using a polycarbonate sheet or a spin-coated ultraviolet (UV) setting resin. A tracking groove is formed on the intermediate layer 705 by a stamper, and a recording film as an L0 recording layer 706 is coated on the layer 705. Thereafter, a 75 μm polycarbonate cover layer 707 is attached onto the L0 recording layer 706. Like the polycarbonate cover layer of the single-layered disk, the polycarbonate cover layer 707 and the intermediate layer 705 have thickness fluctuation associated with their production. Therefore, the cover layer 707 and the intermediate layer 705 have specified thickness of 75 μm±5 μm and 25 μm±5 μm, respectively.

Figure 7C:
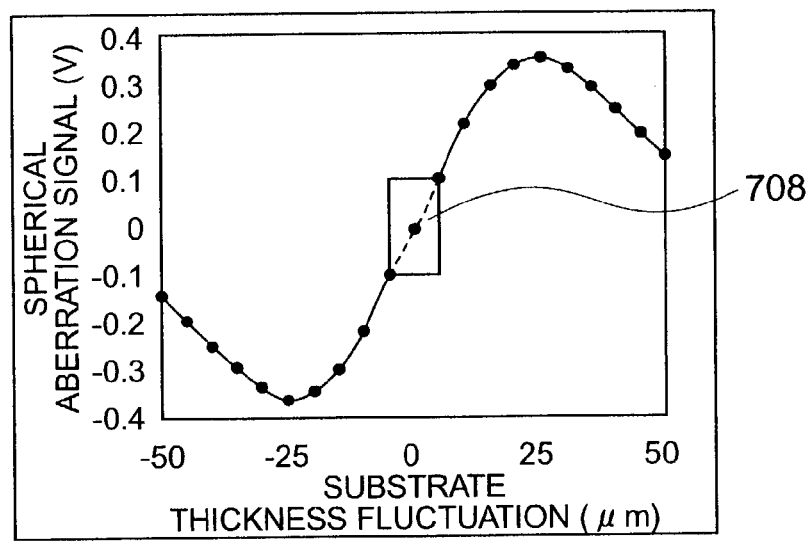
FIGS. 7C and 7D are graphs showing relationships between substrate thickness fluctuations and spherical aberration signals.
Figure 7D:
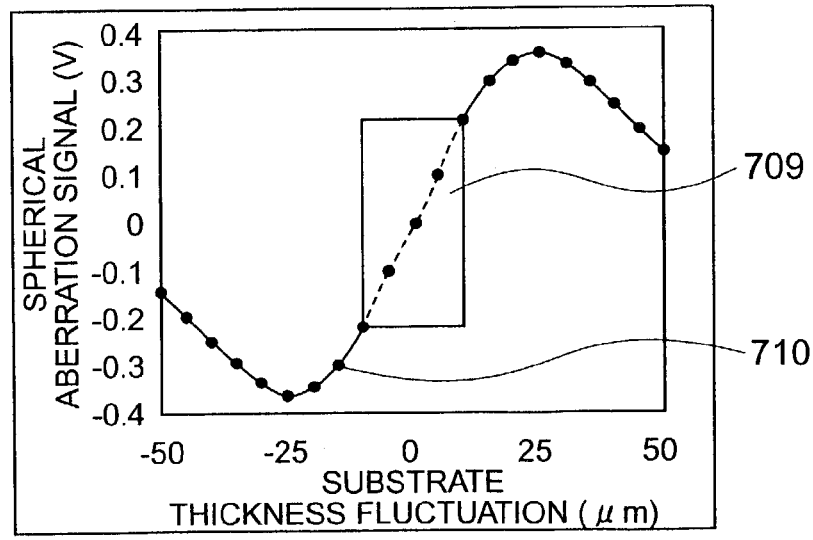

FIGS. 7C and 7D show voltage ranges of spherical aberration signals obtained from the disks specified as above. In FIG. 7C, numeral 708 indicates a range of thickness fluctuation of the single-layered disk and a voltage range of spherical aberration signals obtained therefrom. In FIG. 7D, numeral 709 indicates a range of thickness fluctuation of the L1 recording-layer of the dual-layered disk and a voltage range of spherical aberration signals obtained therefrom and numeral 710 indicates a range of thickness fluctuation of the L0 recording-layer of the dual-layered disk and a voltage range of spherical aberration signals obtained therefrom. In the graph of the single-layered disk, the spherical aberration signal due to the substrate thickness fluctuation in the range of specified values is within a linear range thereof. In this case, by inputting the spherical aberration signal to the servo circuit to drive the spherical aberration correcting element to set the spherical aberration signal to zero, feedback control can be achieved. The spherical aberration correcting element cancels the spherical aberration due to the substrate thickness fluctuation to resultantly obtain a satisfactory reproduction characteristic. In the dual-layered disk, the spherical aberration signal of the L1 recording layer is within a linear range. However, the spherical aberration signal of the L0 recording layer is beyond the linear range. Therefore, the spherical aberration cannot be corrected by the feedback control operation.

Figure 8:
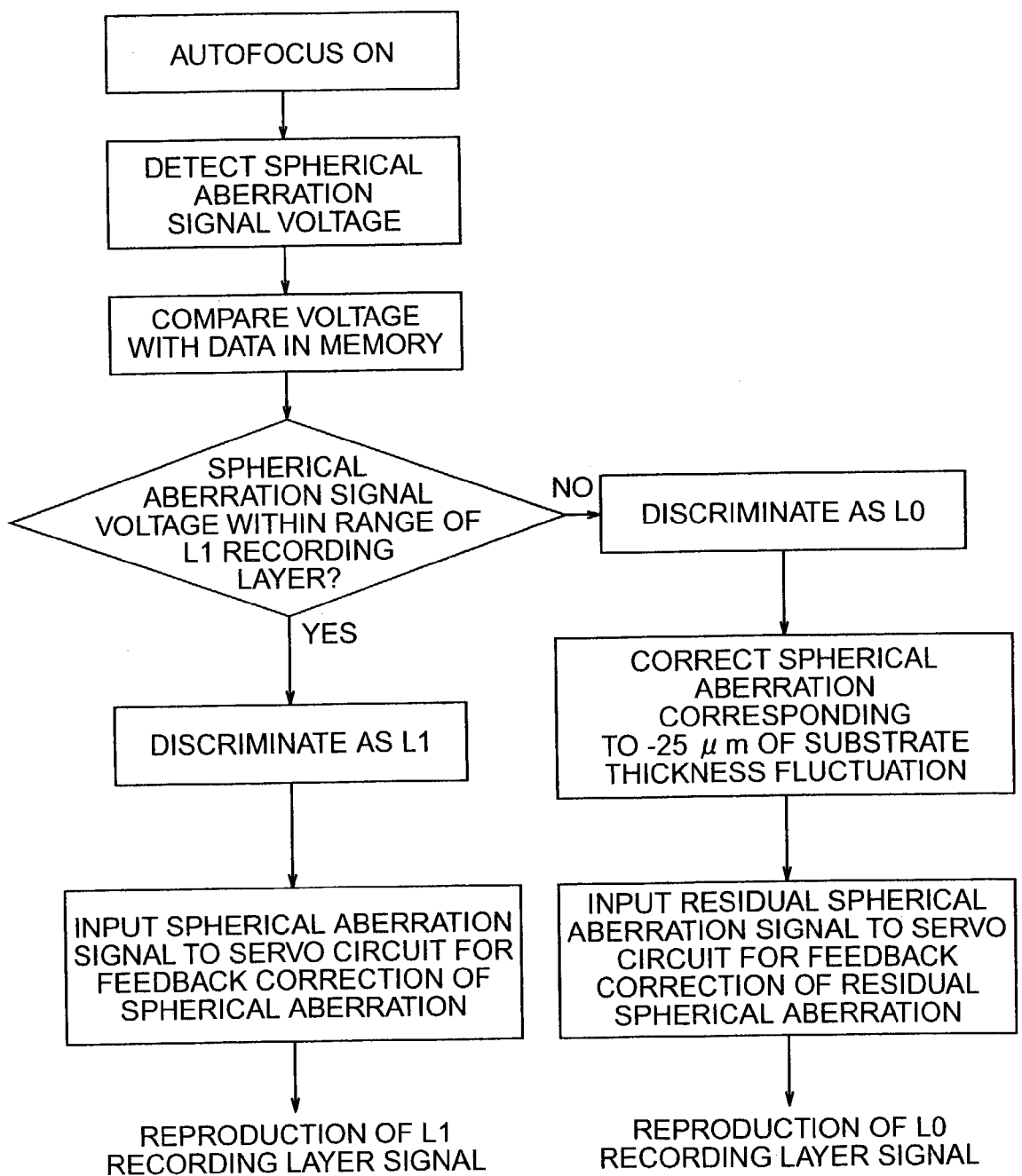
FIG. 8 is a flowchart showing a layer discriminating method (signal level discriminating method) using spherical aberration signals.

To solve the problem to obtain a satisfactory reproduction characteristic also on the dual-layered disk, the information reproducing apparatus includes an organization or a unit to discriminate which one of the layers is in focus using the spherical aberration signal. FIG. 8 shows the discriminating method in a flowchart. First, the disk is rotated and then light is focused on one of the recording layers by an autofocus operation. The CPU then reads a voltage value of the spherical aberration signal and compares the voltage value with a discrimination or judge value beforehand recorded in a memory of the signal processing controller to discriminate the layer in focus. In the embodiment, the discrimination value ranges from −0.33 V to −0.36 V for the L0 recording layer and from −0.22 V to 0.22 V for the L1 recording layer. However, since these values vary depending on characteristic fluctuations of constituent components of the optical head, it is advisable that the system beforehand learns such characteristic fluctuations to store values of the fluctuations in its memory. That is, by using an optical head appropriately adjusted for operation, a voltage range of the spherical aberration signal is measured by an actual disk unit for each layer of the disk due to substrate thickness fluctuation within the specified values and is stored in the memory of the signal processing controller. The memory is suitably a read-only memory (ROM) or a flash memory which can keep information therein even when power of the system is turned off. As above, the layer in focus can be discriminated by comparing the value of the current signal with the data recorded in the memory. Although the CPU and the memory are used to discriminate the condition, an analog circuit of threshold check type may also be used for this purpose. As a result of the discrimination, if light is focused on the L1 layer, the spherical aberration signal is fed to the servo circuit to conduct feedback control. If light is focused on the L0 layer, the spherical aberration for −25 μm as the specified central value is corrected by the spherical aberration correcting element. A quantity of drive of this element is defined as a quantity of substrate thickness fluctuation for correction. That is, the spherical aberration correcting element is driven to cancel spherical aberration occurring when the substrate thickness fluctuation is −25 μm in this case. Since the substrate thickness fluctuation of the L0 recording layer ranges from −5 μm to 5 μm, the spherical aberration signal due to the residual spherical aberration is within a linear range. The residual spherical aberration signal is fed to the servo circuit to conduct the feedback control. This resultantly leads to a satisfactory reproducing characteristic also in a dual-layered disk.

In the dual-layered disk of the embodiment, the L1 recording layer exists at a position of substrate thickness corresponding to an optimal substrate thickness of 100 μm of the objective and the L0 recording layer exists at a position of substrate thickness corresponding to substrate thickness of 75 μm of the objective. It is also possible that the disk layers are symmetrically arranged with respect to the optimal substrate thickness of 100 µm such that the L1 layer is at a position corresponding to a substrate thickness of 100+12.5 µm and the L0 layer is at a position corresponding to a substrate thickness of 100 −12.5 µm. That is, the disk is produced as follows. On a 1.0875 mm polycarbonate layer 701 with a tracking groove formed thereon, a recording film is coated as an L1 recording layer 704 and then a 25 µm thick transparent intermediate layer 705 is formed on the layer 704 using a polycarbonate sheet or a spin-coated UV-setting resin. A tracking groove is formed on the intermediate layer 705 by a stamper and a recording film is coated on the layer 705 for an L0 recording layer 706. Thereafter, a 87.5 µm thick polycarbonate cover layer 707 is attached onto the L0 recording layer 706. Like the embodiment described above, since the polycarbonate cover layer 707 and the intermediate layer 705 have thickness fluctuation associated with their production, the cover layer 707 and the intermediate layer 705 have specified thickness of 87.5±5 µm and 25±5 µm, respectively.

Figure 9:
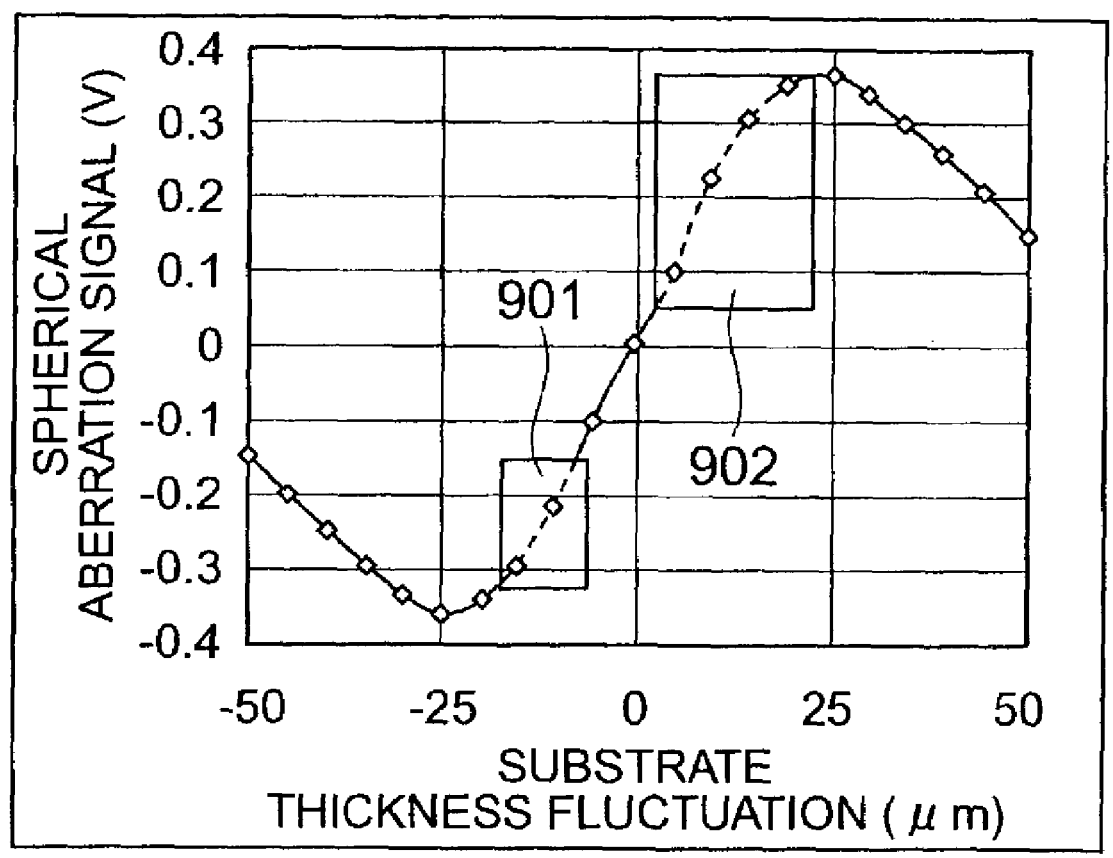
FIG. 9 is a graph showing a relationship between substrate thickness fluctuation and a spherical aberration signal in a dual-layered disk with recording layers symmetrically arranged with respect to optimal substrate thickness.
Figure 10:
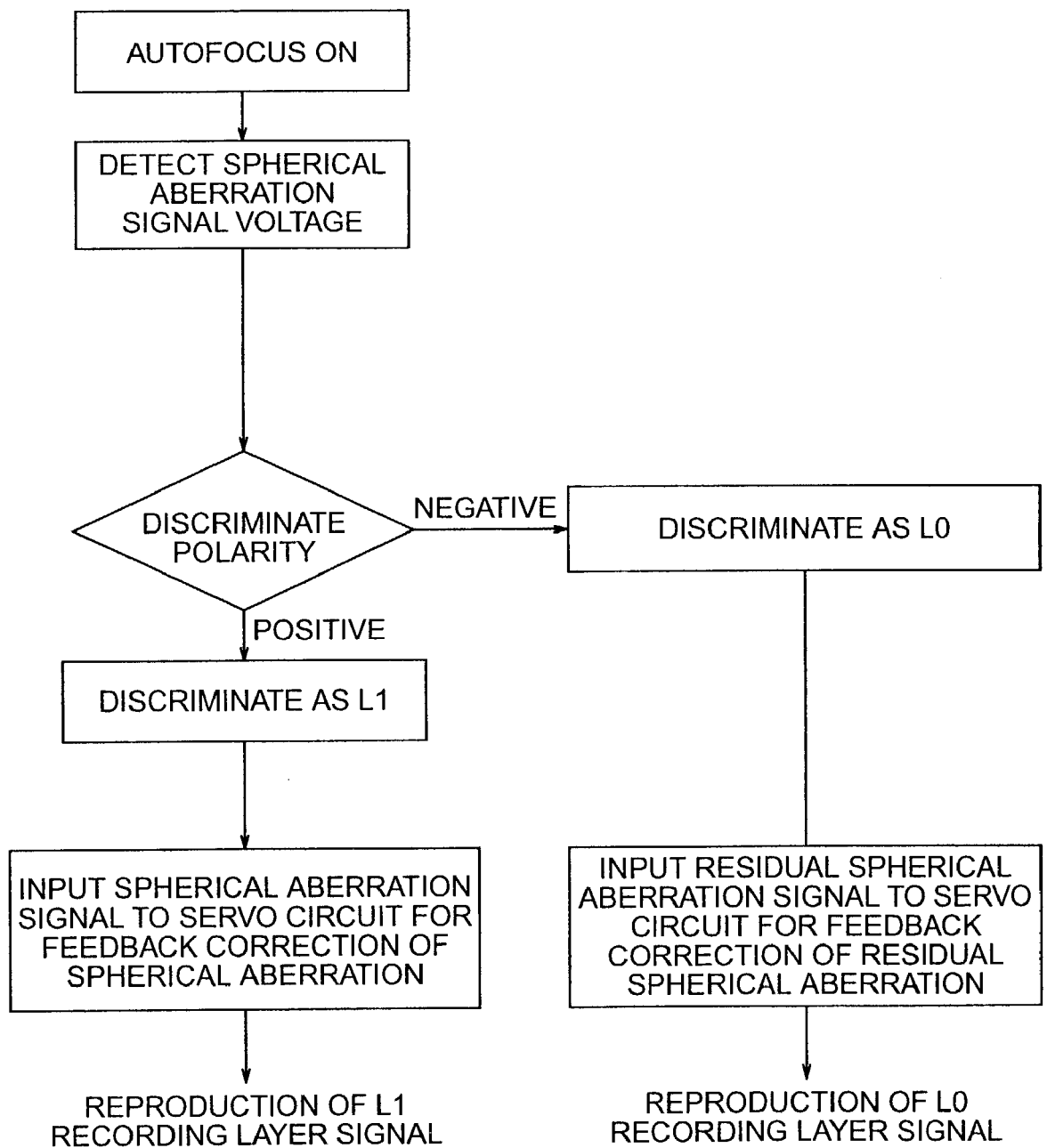
FIG. 10 is a flowchart showing a layer discriminating method (discriminating method according to a polarity) using spherical aberration signals.

FIG. 9 shows a voltage range of a spherical aberration signal obtained from the disk. Numeral 901 indicates a relationship between a substrate thickness fluctuation range of the L0 recording layer and a voltage range of the spherical aberration signal obtained from the L0 layer. Numeral 902 indicates a relationship between a substrate thickness fluctuation range of the L1 recording layer and a voltage range of the spherical aberration signal obtained from the L1 layer. In the dual-layered disk, the voltage of the spherical aberration signal from the L0 layer ranges from −0.15 V to −0.32 V and that of the spherical aberration signal from the L1 layer ranges from 0.05 V to 0.35 V. As in the above embodiment, it is possible that the CPU reads a voltage value of the spherical aberration signal and compares the value with a discrimination value beforehand stored in the memory of the signal processing controller to determine a layer in focus. However, in the present embodiment, the voltages respectively of the spherical aberration signal from the L0 and L1 recording layers are negative and positive, respectively. It is therefore possible to discriminate a layer in focus by determining the polarity of the spherical aberration signal as shown in FIG. 10. In this situation, the signal processing controller needs not to include the memory, and the layer in focus can be discriminated only according to the polarity of the spherical aberration signal. This advantageously simplifies the configuration of the discriminating circuit.

Figure 11A:
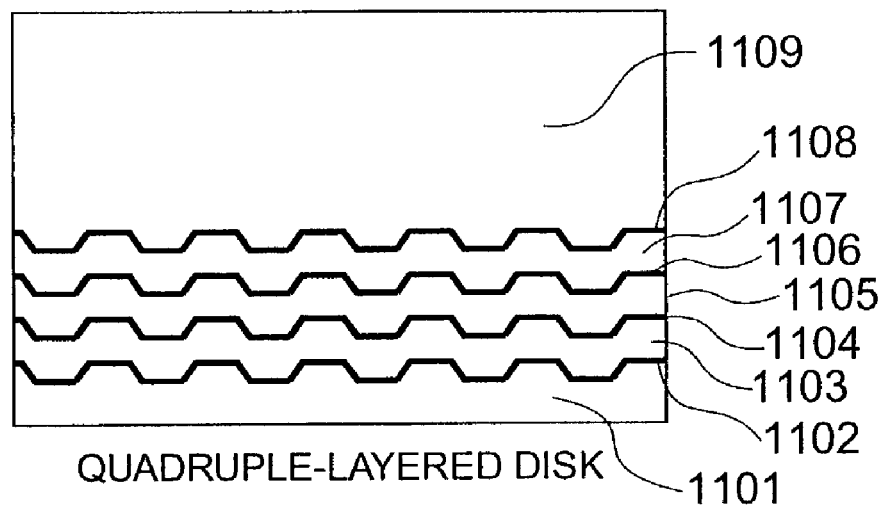
FIGS. 11A and 11B are a diagram and a graph respectively showing a configuration of a quadruple-layered disk and a relationship between substrate thickness fluctuation and a spherical aberration signal of each recording layer.
Figure 11B:
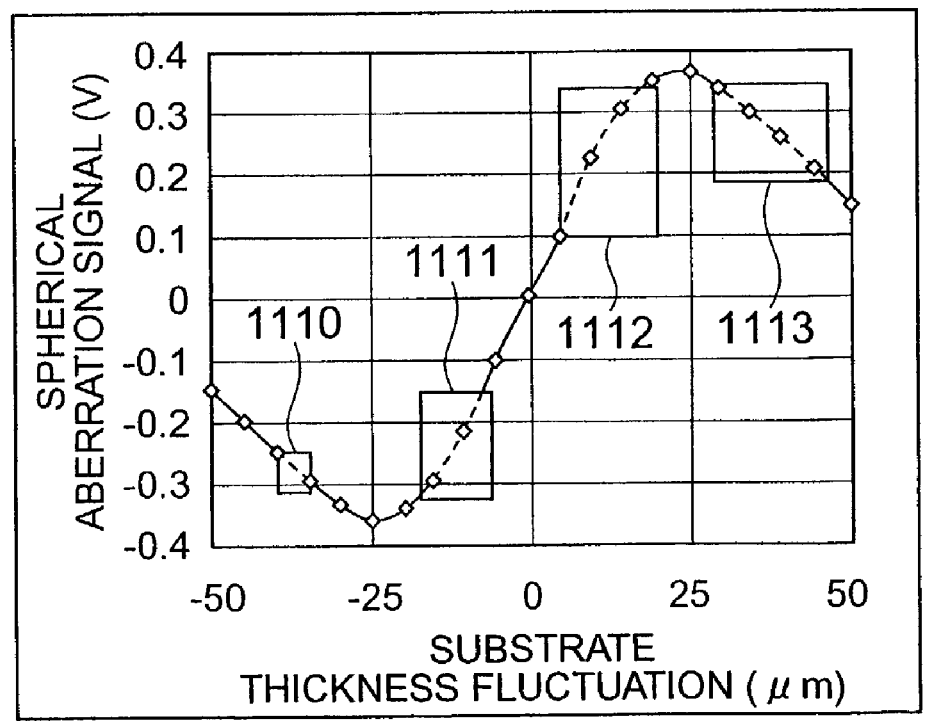

Subsequently, FIG. 11A shows a configuration of a quadruple-layered disk. Basically, this disk is constructed by adding recording layers to the dual-layered disk. On a 62.5 mm thick polycarbonate layer 1101, an L0 recording layer 1102 is coated and then a 25 µm thick transparent intermediate layer 1103 is formed on the layer 704. On the layer 1103, an L1 recording layer 1104 is coated and then a 25 µm thick transparent intermediate layer 1105 is formed on the layer 1104. On the layer 1105, an L2 recording layer 1106 is coated and then a 25 µm thick transparent intermediate layer 1107 is formed on the layer 1104. On the layer 1107, an L3 recording layer 1108 is coated. On the layer 1108, a 1.0625 mm thick polycarbonate substrate 1109 is formed to obtain a total thickness of 1.2 mm. Due to the increased number of recording layers, the error tolerance ranges from −2.5 µm to +2.5 µm for the cover layer and the intermediate layer. FIG. 11B shows a voltage range of the spherical aberration signal obtained from the disk conforming to the specifications. Numeral 1110 indicates a relationship between a range of substrate thickness fluctuation of the L0 recording layer and a voltage range of the spherical aberration signal from the L0 recording layer. Numeral 1111 indicates a relationship between a range of substrate thickness fluctuation of the L1 recording layer and a voltage range of the spherical aberration signal from the L1 recording layer. Numeral 1112 indicates a relationship between a range of substrate thickness fluctuation of the L2 recording layer and a voltage range of the spherical aberration signal from the L2 recording layer. Numeral 1113 indicates a relationship between a range of substrate thickness fluctuation of the L3 recording layer and a voltage range of the spherical aberration signal from the L3 recording layer. In the quadruple-layered disk, since spherical aberration signals overlap with each other between the L0 and L1 layers and between the L2 and L3 layers, it is impossible to discriminate a layer in focus on the basis of voltage levels of the spherical aberration signals.

Figure 12:
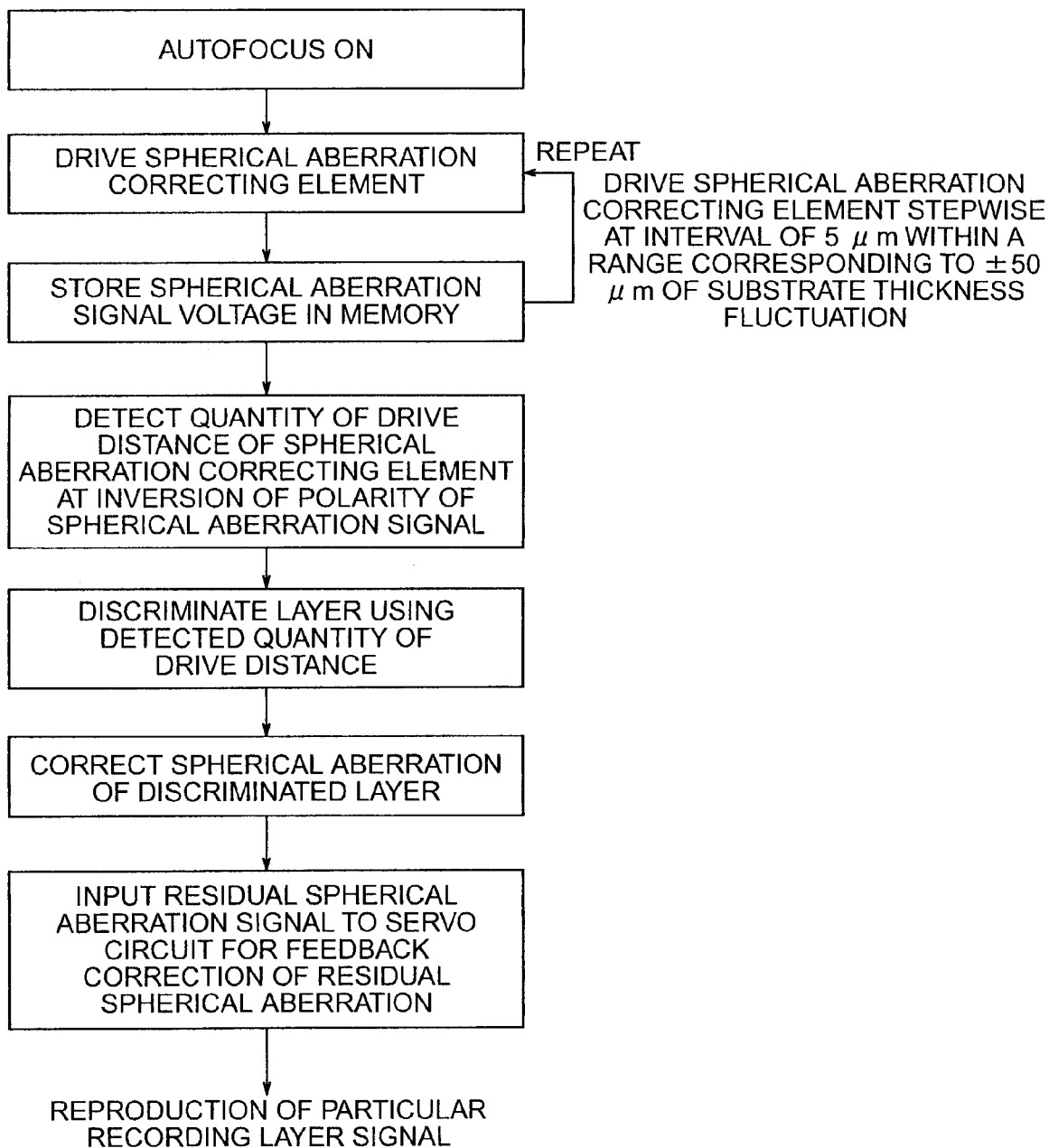
FIG. 12 is a flowchart showing a layer discriminating method (zero-crossing point detecting method) using spherical aberration signals.

The information reproducing apparatus includes an organization to solve the problem to achieve a sufficient reproduction characteristic for the quadruple-layered disk. FIG. 12 shows a method adopted to obtain the sufficient reproduction characteristic. First, the disk is rotated and then light is focused on one of the recording layers. The CPU issues an instruction to the circuit to drive the spherical aberration correcting element. That is, the driver circuit stepwise drives the correcting element at an interval of a correction quantity of five micrometers (µm) to correct spherical aberration due to substrate thickness fluctuation ranging from −50 µm to 50 µm. During the operation, the CPU detects the voltage of the spherical aberration signal at the interval to store a relationship between the quantity of drive of the spherical aberration correcting element and the voltage of the spherical aberration signal in the memory. After the operation is completely conducted for 21 points to store the relationship in the memory, the CPU detects the quantity of drive of the spherical aberration correcting element corresponding to a point at which the polarity of the voltage value of the spherical aberration signal stored in the memory is inverted. This point is an inversion point of the polarity of the spherical aberration signal. At this point, the spherical aberration signal crosses a zero point (zero-crossing point). The CPU makes comparison for a correspondence between each layer and the quantity of correction of the drive quantity of the spherical aberration correcting element stored in the memory. When the spherical aberration signal is zero, the spherical aberration due to the substrate thickness fluctuation is substantially equal to that to be canceled by the spherical aberration correcting element. Therefore, the quantity of drive corresponds to the quantity of spherical aberration of a layer in focus. That is, the CPU can discriminate the quantity of substrate thickness fluctuation using the quantity of drive and then the layer in focus according to the quantity of substrate thickness fluctuation. FIG. 13 shows an example of a relationship between the quantity of drive of the spherical aberration correcting element and the voltage value of the spherical aberration signal stored in the memory as above. The voltage obtained when the spherical aberration correcting element is not driven is −0.3 V. It is impossible to determine using the voltage level of the spherical aberration signal which one of the L0 and L1 recording layers is in focus. According to the relationship between the quantity of drive of the spherical aberration correcting element and the voltage value of the spherical aberration signal stored in the memory, the quantity of drive at polarity inversion is obtained as −15 µm in terms of quantity of correction. Therefore, it is determined that the L1 recording layer is in focus. In the embodiment, as shown in FIG. 11B, when the drive quantity of the spherical aberration correcting element at the zero-crossing point of the spherical aberration signal ranges from −35 μm to −40 μm, the L0 recording layer is in focus. When the drive quantity ranges from −7.5 μm to −17.5 μm, the L1 recording layer is in focus. When the drive quantity ranges from 2.5 μm to 20 μm, the L2 recording layer is in focus. When the drive quantity ranges from 27.5 μm to 47.5 μm, the L3 recording layer is in focus. After the pertinent layer is discriminated as above, the spherical aberration correcting element corrects the spherical aberration by the quantity of correction for the layer. If the L0 recording layer is in focus, the quantity of correction is −37.5 μm. If the L1 recording layer is in focus, the quantity of correction is −12.5 μm. If the L2 recording layer is in focus, the quantity of correction is 12.5 μm. If the L3 recording layer is in focus, the quantity of correction is 37.5 μm. The spherical aberration signal due to the residual spherical aberration is within a linear range for each layer. Therefore, the residual spherical aberration signal is fed to the servo circuit for feedback control to obtain a sufficient reproduction characteristic also for a quadruple-layered disk. The CPU conducts the discriminating operation using the memory while stepwise driving the spherical aberration correcting element by a predetermined quantity. However, it is also possible that the spherical aberration correcting element is continuously driven to conduct the discrimination by an analog circuit of threshold check type. If there possibly exists a chance of wrong detection when the discrimination is conducted only by the polarity inversion of the spherical aberration signal, the detection can be more appropriately carried out by additionally checking the linearity of the spherical aberration signal for the discrimination. That is, the detection can be more appropriately achieved in the present embodiment if the quantity of drive is obtained at polarity inversion of the spherical aberration signal when the quantity of variation of the spherical aberration signal is about 0.1 V for a substrate thickness fluctuation of 5 μm. Although the embodiment uses a quadruple-layered disk, the number of layers may be more than four. Or, the present invention efficiently applies also to a dual-layered disk of which a gap between the layers cannot be discriminated using levels of spherical aberration signals. Moreover, even for a multilayer disk having five or more layers, if levels of spherical aberration signals of the respective recording layers are independently separated from each other, the discrimination method described for the dual-layered disk can be efficiently used. According to the present invention, the target layer can be discriminated without reading recorded signals from the disk. Therefore, the present invention is applicable to multilayer disks of rewrite type, read-only type, and write-once type.

Figure 14:
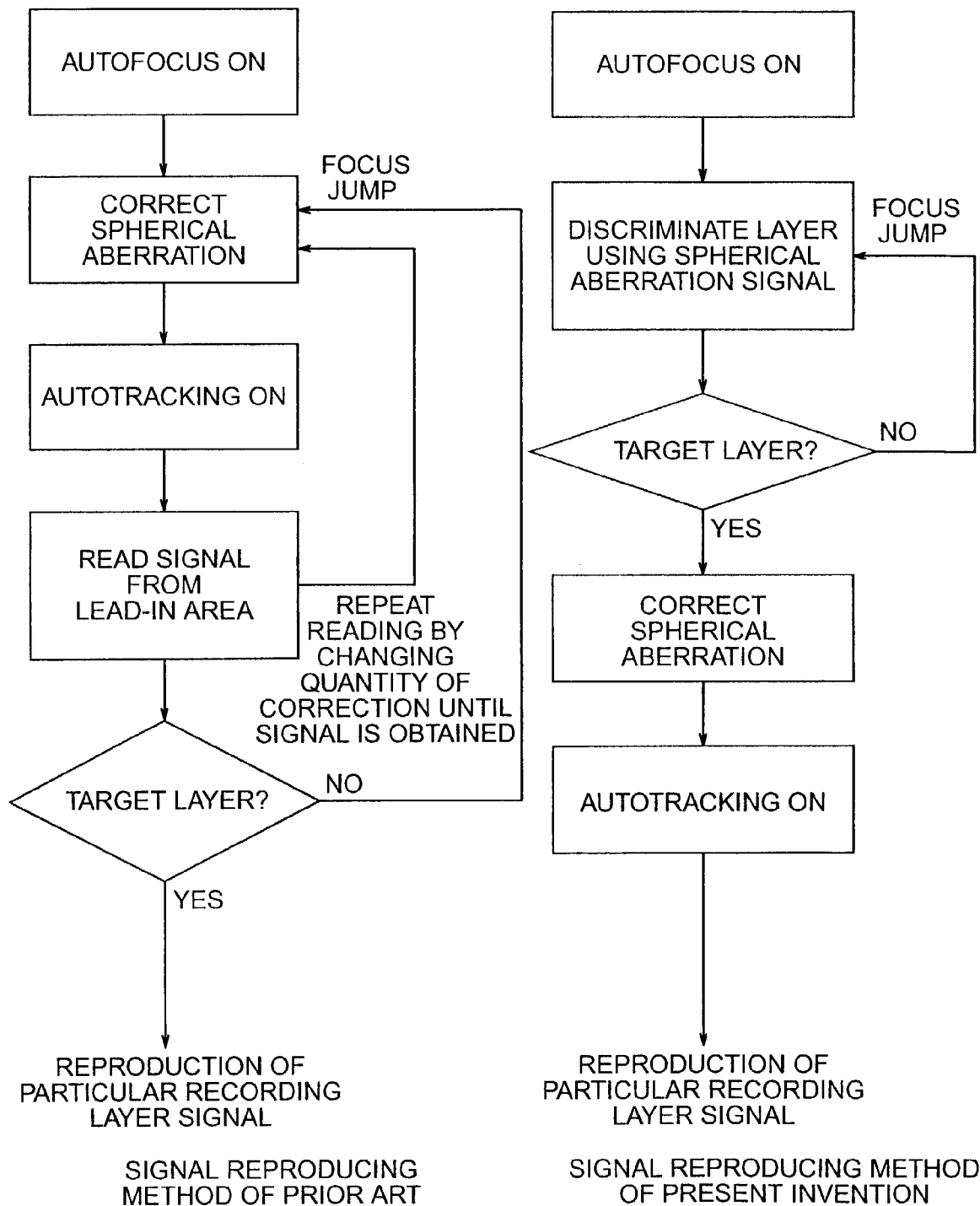
FIG. 14 is a flowchart comparing diagram to compare the signal reproducing method of the prior art with that of the present invention.

Referring now to FIG. 14, description will be given of advantage of the method of and an apparatus for reproducing information of a multilayer disk according to the present invention. FIG. 14 is flowchart of multilayer disk information reproducing methods according to the prior art and the present invention, respectively. In the prior art example, to discriminate a layer in focus, layer information recorded in a lead-in area must be reproduced. For this purpose, spherical aberration due to substrate thickness fluctuation must be corrected. Whether or not the spherical aberration is corrected is determined by whether or not signals are appropriately reproduced. Therefore, a trial-and-error operation must be repeatedly conducted in this step. After the layer information is read from the disk, whether or not the associated layer is a target layer is determined. However, since which one of the layers is in focus is determined according to probability depending on cases, if the associated layer is not the target layer, the above step must be executed again. This elongates the period of time required before the target layer is reproduced. In the information reproducing method of the present invention, after a focusing operation is conducted, a layer in focus is discriminated using spherical aberration signals, and the layer is confirmed as a target layer. Thereafter, spherical aberration is corrected and autotracking is conducted to reproduce signals. Consequently, the period of time required before the target layer is reproduced becomes shorter when compared with the prior art example. Since the reproduction of the lead-in area is not required to discriminate the layer, all layers can include the same lead-in area. Resultantly, the process to manufacture the multilayer disk becomes simpler than that of the prior art example, and hence the production cost of the multilayer disk can be reduced.

The following information reproducing apparatus is also disclosed.

(A) An information reproducing apparatus for reproducing information recorded on an information recording medium having a plurality of information recording layers by radiating light onto the information recording medium, comprising:
a light source;
means for focusing light on a predetermined one of the layers;
spherical aberration detecting means for detecting spherical aberration signals of spherical aberrations respectively of the layers;
spherical aberration correcting means for correcting the spherical aberrations;
driving means for driving the spherical aberration correcting means; and
layer discriminating means for discriminating the predetermined layer using a quantity of drive of the spherical aberration correcting means when a polarity of each of the spherical aberration signals is inverted,
the spherical aberration correcting means adding a quantity of spherical aberration to correct the spherical aberration due to substrate thickness fluctuation of the discriminated layer discriminated by the layer discriminating means.

(B) The information reproducing apparatus according to (A) above, further comprising storing means for storing therein values of spherical aberration signals respectively of the layers, the values being obtained by driving the spherical aberration correcting means.

(C) The information reproducing apparatus according to (A) above, the layer discriminating means further discriminating the predetermined layer using linearity of each of the spherical aberration signals.

According to the present invention, each layer of a multilayer disk can be discriminated without reading signals from a lead-in area of the disk. Therefore, the period of time required from when the disk is loaded to when the disk is reproduced can be reduced. Moreover, spherical aberration of the multilayer disk which cannot be corrected only be feeding back spherical aberration signals can be corrected. Therefore, the multilayer optical disk is reproduced with high reliability. Additionally, since the layer information needs not to be beforehand recorded on the multilayer disk, the disk production cost can be reduced.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information reproducing method of reproducing information recorded on an information recording medium having a plurality of information recording layers by radiating light onto the information recording medium, comprising the steps of: focusing light on a predetermined one of the layers; driving spherical aberration correcting means and detecting a quantity of drive of the spherical aberration correcting means when the polarity of the spherical aberration signal is inverted; discriminating the predetermined layer using the quantity of drive; adding a quantity of spherical aberration to correct spherical aberration due to substrate thickness fluctuation of the discriminated layer discriminated by the discriminating step; and reproducing information on the predetermined layer.

2. An information reproducing method according to claim 1, further comprising the step of driving spherical aberration correcting means and storing values of spherical aberration signals respectively of the layers in a memory.

3. An information reproducing method according to claim 1, further comprising the step of detecting the quantity of drive using linearity of the spherical aberrtion signal.

* * * * *